(12) United States Patent
Yang (10) Patent No.: US 12,221,146 B2
(45) Date of Patent: Feb. 11, 2025

(54) FOLDABLE WAGON

(71) Applicant: Zhejiang Hengfeng Top Leisure Co., Ltd., Zhejiang (CN)

(72) Inventor: Baoqing Yang, HangZhou (CN)

(73) Assignee: Zhejiang Hengfeng Top Leisure Co., Ltd., Zhejiang (CN)

( * ) Notice: Subject to any disclaimer, the term of this patent is extended or adjusted under 35 U.S.C. 154(b) by 309 days.

(21) Appl. No.: 17/867,970

(22) Filed: Jul. 19, 2022

(65) Prior Publication Data

US 2023/0040903 A1 Feb. 9, 2023

(30) Foreign Application Priority Data

Aug. 6, 2021 (CN) .......................... 202110903215.4

(51) Int. Cl.
B62B 3/02 (2006.01)
(52) U.S. Cl.
CPC .................................... B62B 3/025 (2013.01)
(58) Field of Classification Search
CPC ..................................................... B62B 3/025
See application file for complete search history.

(56) References Cited

U.S. PATENT DOCUMENTS

| | | | |
|---|---|---|---|
| 9,073,564 B2 | 7/2015 | Yang et al. | |
| 9,211,897 B2 | 12/2015 | Yang et al. | |
| 9,738,298 B1 | 8/2017 | Yang et al. | |
| 9,969,227 B1* | 5/2018 | McNeave | B62B 3/007 |
| 10,081,380 B2* | 9/2018 | Fitzwater | B62B 3/007 |
| 10,392,042 B2 | 8/2019 | Fitzwater et al. | |
| 10,988,153 B1* | 4/2021 | Horowitz | B62B 7/008 |
| 11,225,277 B1* | 1/2022 | Sun | B62B 5/061 |
| 11,332,178 B2 | 5/2022 | Yang | |
| 11,608,098 B1* | 3/2023 | Horowitz | B62B 3/004 |
| 2018/0327011 A1* | 11/2018 | Horowitz | B62B 3/025 |
| 2020/0031376 A1* | 1/2020 | Horowitz | B62B 3/025 |
| 2021/0061331 A1* | 3/2021 | Wu | B62B 3/022 |
| 2021/0300450 A1 | 9/2021 | Yang | |
| 2022/0041199 A1* | 2/2022 | Tong | B62B 3/025 |
| 2022/0089207 A1* | 3/2022 | Gavin | B62B 3/025 |
| 2022/0097748 A1* | 3/2022 | Ma | B62B 5/0433 |
| 2022/0105973 A1* | 4/2022 | Jennings | B62B 3/005 |
| 2022/0126900 A1* | 4/2022 | Zhang | B62B 5/067 |
| 2023/0040903 A1* | 2/2023 | Yang | B62B 3/007 |
| 2023/0049293 A1* | 2/2023 | Wu | B62B 3/007 |
| 2023/0094718 A1* | 3/2023 | Zhou | B62B 3/025 |
| | | | 280/651 |

(Continued)

*Primary Examiner* — Erez Gurari
(74) *Attorney, Agent, or Firm* — Thompson Coburn LLP (57) ABSTRACT

A foldable wagon frame has a front wheel frame hingedly connected with a rear wheel frame to form a horizontal support frame when the frame is expanded. A lower part of the front wheel frame has at least two front folding rods, and a lower part of the rear wheel frame has at least two rear folding rods. A front folding rod and corresponding rear folding rod are hinged by a middle horizontal hinge shaft. A cross-folding frame is arranged below the horizontal support frame. The cross-folding frame includes a front cross rod and a rear cross rod. The front cross rod is connected with a lower end of the front wheel frame. The rear cross rod is connected with the lower part of the rear wheel frame. The front cross rod and the rear cross rod are hinged with each other through a vertical hinge shaft.

12 Claims, 7 Drawing Sheets

(56) References Cited

U.S. PATENT DOCUMENTS

| | | | |
|---|---|---|---|
| 2023/0117703 A1* | 4/2023 | Sturgeon | B62B 3/025 |
| | | | 280/651 |
| 2023/0242168 A1* | 8/2023 | Clemmer | B62B 5/0013 |
| | | | 280/651 |
| 2023/0365179 A1* | 11/2023 | Liu | B62B 7/06 |
| 2024/0124040 A1* | 4/2024 | Conn | B62B 5/067 |
| 2024/0166253 A1* | 5/2024 | Feng | B62B 3/02 |
| 2024/0190492 A1* | 6/2024 | Frankel | B62B 3/025 |

* cited by examiner

FOLDABLE WAGON

RELATED APPLICATION DATA

This application claims priority benefit to Chinese patent application serial no. 202110903215.4 filed on Aug. 6, 2021, the disclosure of which is incorporated by reference herein.

FIELD

The present application relates to the technical field of foldable wagons, and in particular to a foldable wagon frame.

BACKGROUND

Foldable wagons are very popular because they can provide a lot of convenience for daily shopping and cargo handling, and take up little space after being folded. In the existing foldable wagon, connecting rods are generally required to be arranged on two sides of the wagon frame, and a scissors cross mechanism for realizing the folding function is formed between the connecting rods. However, the connecting rods limit the storage space of the foldable wagon, and if more storage space is required, the chassis of the foldable wagon needs to be enlarged. This also results in an excessively large volume of the foldable wagon, and brings inconvenience for the user to store the foldable wagon.

Therefore, how to increase the storage space without adversely affecting the volume of the foldable wagon is a technical issue that those skilled in the art need to address urgently.

SUMMARY

An object of the present application is to provide a foldable wagon frame, which supports the storage space through a horizontal support frame and a cross-folding frame, where there is no need to provide connecting rods on two sides of the foldable wagon frame, thus increasing the storage space.

In order to achieve the above object, a foldable wagon frame is provided according to the present application, which includes a front wheel frame and a rear wheel frame. A lower part of the front wheel frame has at least two front folding rods, and a lower part of the rear wheel frame has at least two rear folding rods. One of the front folding rods is hingedly connected with a corresponding rear folding rod with a middle horizontal hinge shaft. The front folding rods and the rear folding rods form a horizontal support frame when the frame is in an expanded configuration. A cross-folding frame is arranged below the horizontal support frame, which includes a front cross rod and a rear cross rod. The front cross rod is connected with the lower part of the front wheel frame. The rear cross rod is connected with a lower end of the rear wheel frame. The front cross rod and the rear cross rod are hingedly connected with each other through a vertical hinge shaft.

Preferably, the front wheel frame includes two front vertically-oriented poles, and the rear wheel frame includes two rear vertically-oriented poles.

Preferably, the number of the front folding rods is two, the lower parts of the two front vertically-oriented poles are each sleeved with a front connecting sleeve, and the two front folding rods are respectively hinged with the two front lower connecting sleeves through two front horizontal hinge shafts.

Preferably, the front lower connecting sleeve allows for rotation of the front vertically oriented pole relative to the respective front folding rod.

Preferably, the front wheel frame includes a front frame member. Preferably, the front frame member is operatively connected with the upper part of a front vertically oriented pole with a front upper connecting sleeve. The front upper connecting sleeve is preferably sleeved on an upper part of each of the front vertically oriented poles. Preferably, the front upper connecting sleeve allows for rotation of the front vertically oriented pole relative to the respective front frame member.

Preferably, the number of the rear folding rods is two, the lower parts of the two rear vertically-oriented poles are each sleeved with a rear connecting sleeve, and the two rear folding rods are respectively hinged with the two rear connecting sleeves through two rear horizontal hinge shafts.

Preferably, the rear connecting sleeve allows for rotation of the rear vertically oriented pole relative to the respective rear folding rod.

Preferably, the rear wheel frame includes a rear frame member. Preferably, the rear frame member is operatively connected with the upper part of a rear vertically oriented pole with a rear upper connecting sleeve. The rear upper connecting sleeve is preferably sleeved on an upper part of each of the rear vertically oriented poles. Preferably, the rear upper connecting sleeve allows for rotation of the rear vertically oriented pole relative to the respective rear frame member.

Preferably, one support beam is arranged between the two front folding rods, and another support beam is arranged between the two rear folding rods.

Preferably, a snapping post is provided on the horizontal support frame, and the cross-folding frame is provided with a damping member for snapping and cooperating with the snapping post.

Preferably, the number of the front cross rods is two, and the two front cross rods are respectively fixedly connected with the lower ends of the two front vertically-oriented poles; the number of the rear cross rods is two, and the two rear cross rods are respectively fixedly connected with the lower parts of the two rear vertically-oriented poles; where the two front cross rods are crossed and the two rear cross rods are also crossed, and the front cross rod and the rear cross rod on the same side are hinged with each other through a vertical hinge shaft.

Preferably, the lower ends of the two front vertically-oriented poles are respectively connected with two swivel wheels, and the lower ends of the two rear vertically-oriented poles are respectively connected with two ends of a rear axle, where the two ends of the rear axle are each provided with a rear wheel.

Preferably, a cross sliding sleeve is arranged between the two front cross rods and/or a cross sliding sleeve is arranged between the two rear cross rods.

Preferably, projections of the two swivel wheels on the rear axle are located between the two rear wheels.

The foldable wagon frame provided according to the present application includes a front wheel frame and a rear wheel frame. A lower part of the front wheel frame has at least two front folding rods, and a lower part of the rear wheel frame has at least two rear folding rods. A front folding rod and a rear folding rods are hingedly connected by a middle horizontal hinge shaft. The front folding rods and the rear folding rods are connected to form a horizontal support frame when the frame is in the expanded configuration. A cross-folding frame is arranged below the horizontal support frame, which includes a front cross rod and a rear cross rod. The front cross rod is connected with the lower end of the front wheel frame. The rear cross rod is connected with the lower part of the rear wheel frame. The front cross rod and the rear cross rod are hinged with each other through a vertical hinge shaft.

When the foldable wagon frame is being folded, the front wheel frame and the rear wheel frame are moved toward each other, the middle horizontal hinge shaft between the front folding rods and the rear folding rods moves upward, so that the horizontal support frame is folded. Meanwhile, both the front cross rod and the rear cross rod are rotated around the vertical hinge shaft, so that the cross-folding frame is folded. Since both the cross-folding frame and the horizontal support frame can support the storage space, the chassis of the foldable wagon frame has sufficient strength. There is no need to provide connecting rods on the two sides of the foldable wagon frame, so the two sides of the foldable wagon frame are open, increasing the storage space. Moreover, the volume of the foldable wagon frame does not increase, and the space occupied by the foldable wagon frame as folded does not increase either.

BRIEF DESCRIPTION OF THE DRAWINGS

For more clearly illustrating embodiments of the present application or the technical solutions in the conventional technology, the drawings to be used in the description of the embodiments or the conventional technology will be briefly described hereinafter. The drawings in the following description show only some embodiments of the present application, and are to considered illustrative and not limiting in any sense.

Reference numerals in FIGS. 1 to 7 are as follows: front vertically-oriented pole 1, rear vertically-oriented pole 2, front folding rod 3, rear folding rod 4, middle horizontal hinge shaft 5, front horizontal hinge shaft 6, rear horizontal hinge shaft 7, front cross rod 8, rear cross rod 9, vertical hinge shaft 10, cross sliding sleeve 11, front connecting sleeve 12, rear connecting sleeve 13, rear axle 14, snapping post 15, damping member 16, universal wheel 17, rear wheel 18, handrail 19, storage basket assembly 20; front frame member 111; rear frame member 113; front upper sleeve connection 121; fixed groove 122, rear upper sleeve connection 123, pin 124.

DETAILED DESCRIPTION

Figure 1:
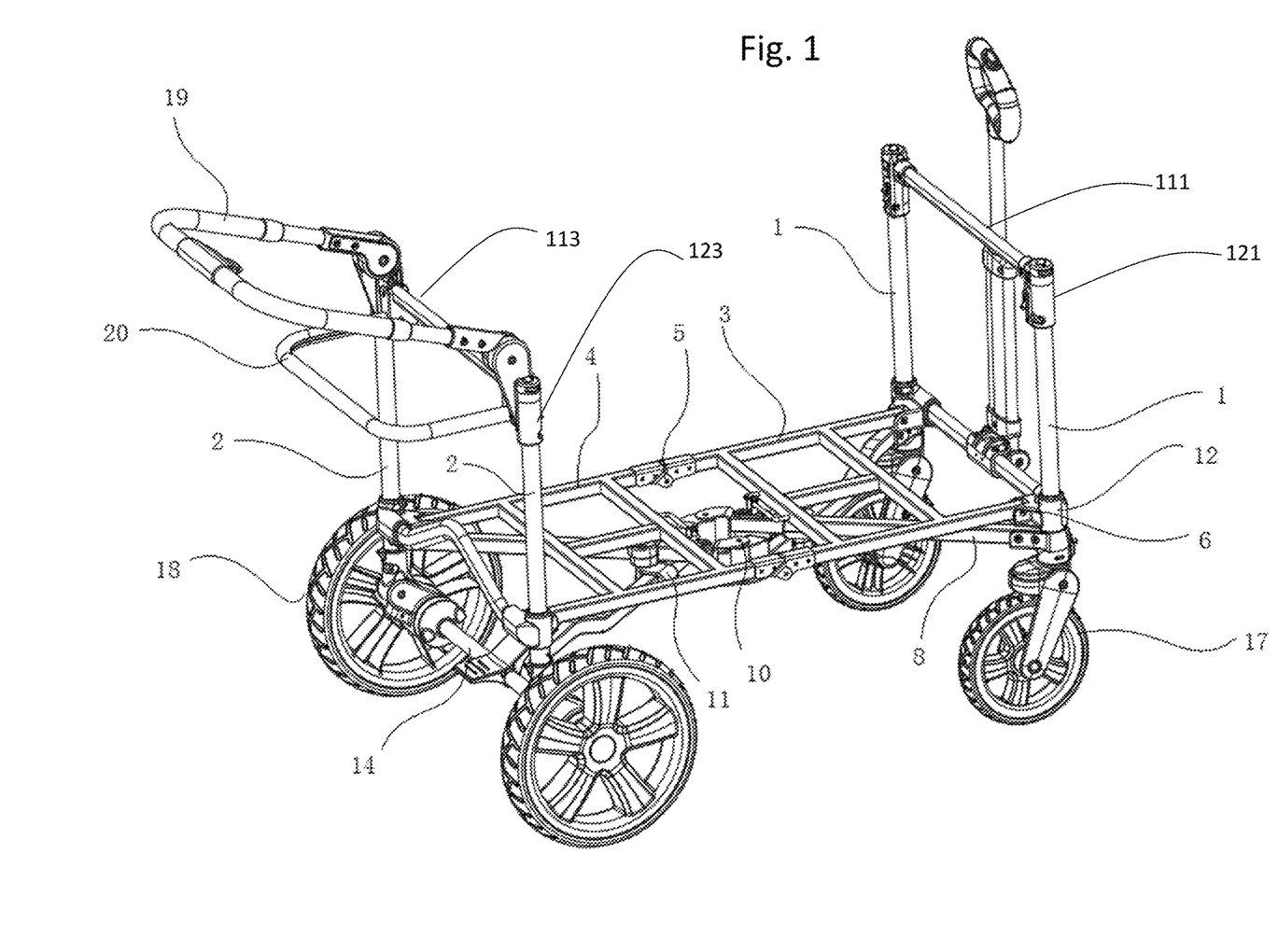
FIG. 1 is a structural schematic diagram of a foldable wagon frame provided by the present application after it is unfolded.
Figure 2:
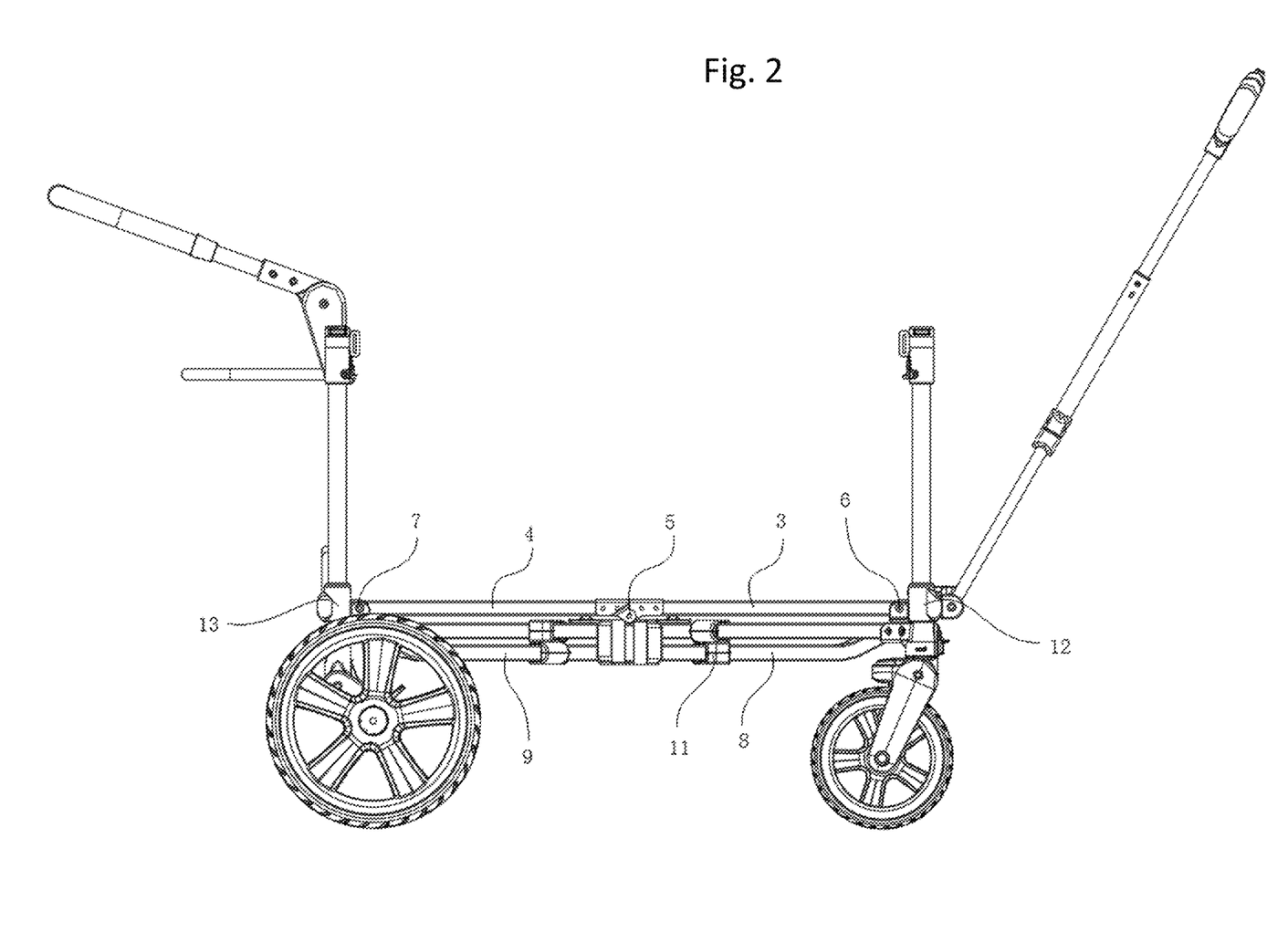
FIG. 2 is a side view of the foldable wagon frame in FIG. 1 after it is unfolded.

The structure of the foldable wagon frame provided by the present application is shown in FIG. 1, including a front wheel frame and a rear wheel frame. The front wheel frame and the rear wheel frame are respectively located in two parallel vertical planes, and they are connected together by a horizontal support frame. The front wheel frame, the horizontal support frame, and the rear wheel frame form a "U"-shaped structure when the wagon frame is in the expanded configuration. The horizontal support frame includes at least two front folding rods 3 and at least two rear folding rods 4. All the front folding rods 3 are hinged connected with corresponding rear folding rods 4 with a middle horizontal hinge shaft 5.

In a specific embodiment of the present application, two front folding rods 3 and two rear folding rods 4 are provided, the two front folding rods 3 are in one-to-one correspondence with the two rear folding rods 4, and the two front folding rods 3 are hinged with the two rear folding rods 4 through two middle horizontal hinge shafts 5 respectively. The front folding rods 3 and the rear folding rods 4 as connected form two folding rod mechanisms that bend or pivot in the middle about the hinge shafts 5. The two folding rod mechanisms are respectively located on opposite lateral sides of the horizontal support frame. The horizontal support frame further includes a support beam perpendicular to the folding rod mechanisms, where two ends of the support beam are respectively fixedly connected with the two folding rod mechanisms. In order to ensure the strength of the horizontal support frame, support beams are preferably provided between the front folding rods 3 and between the rear folding rods 4. As shown in FIG. 1, two support beams are provided between the front folding rods 3, and another two support beams are provided between the rear folding rods 4. One may provide multiple front folding rods 3, multiple rear folding rods 4, and corresponding hinge shafts 5, as required. The hinge of the front folding rods 3 with the rear folding rods 4 through the middle horizontal hinge shaft 5 may refer to the conventional technology. For example, the length of the middle horizontal hinge shaft 5 may be equal to the width of the horizontal support frame, and all the front folding rods 3 and all the rear folding rods 4 are connected with the same middle horizontal hinge shaft 5 to realize hinged connection. Alternatively, as shown in the drawings, a respective hinge shaft 5 may be provided for each front and rear folding rod.

Figure 6:
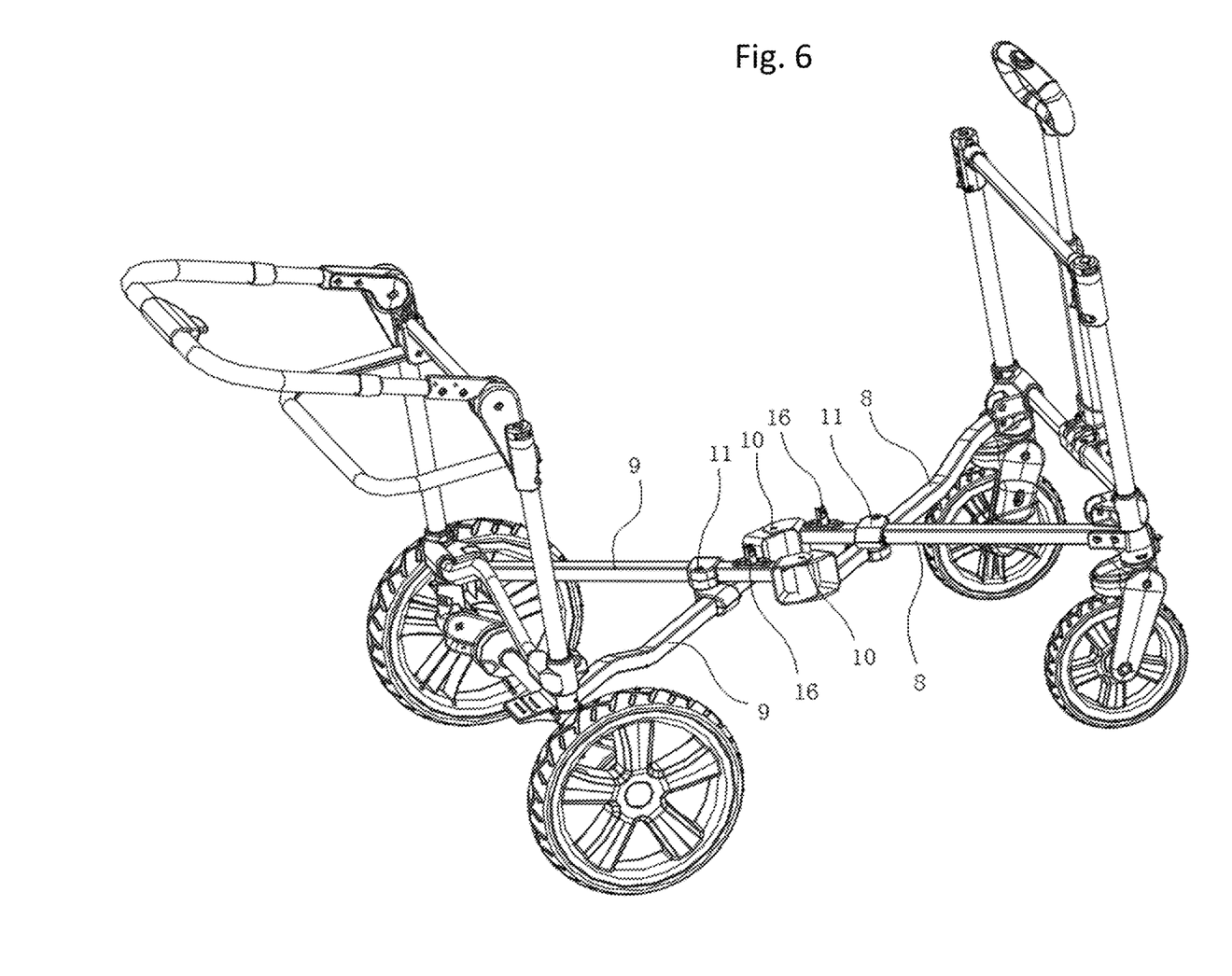
FIG. 6 is a structural schematic diagram of the foldable wagon frame in FIG. 1 after the support frame is unfolded.
Figure 7:
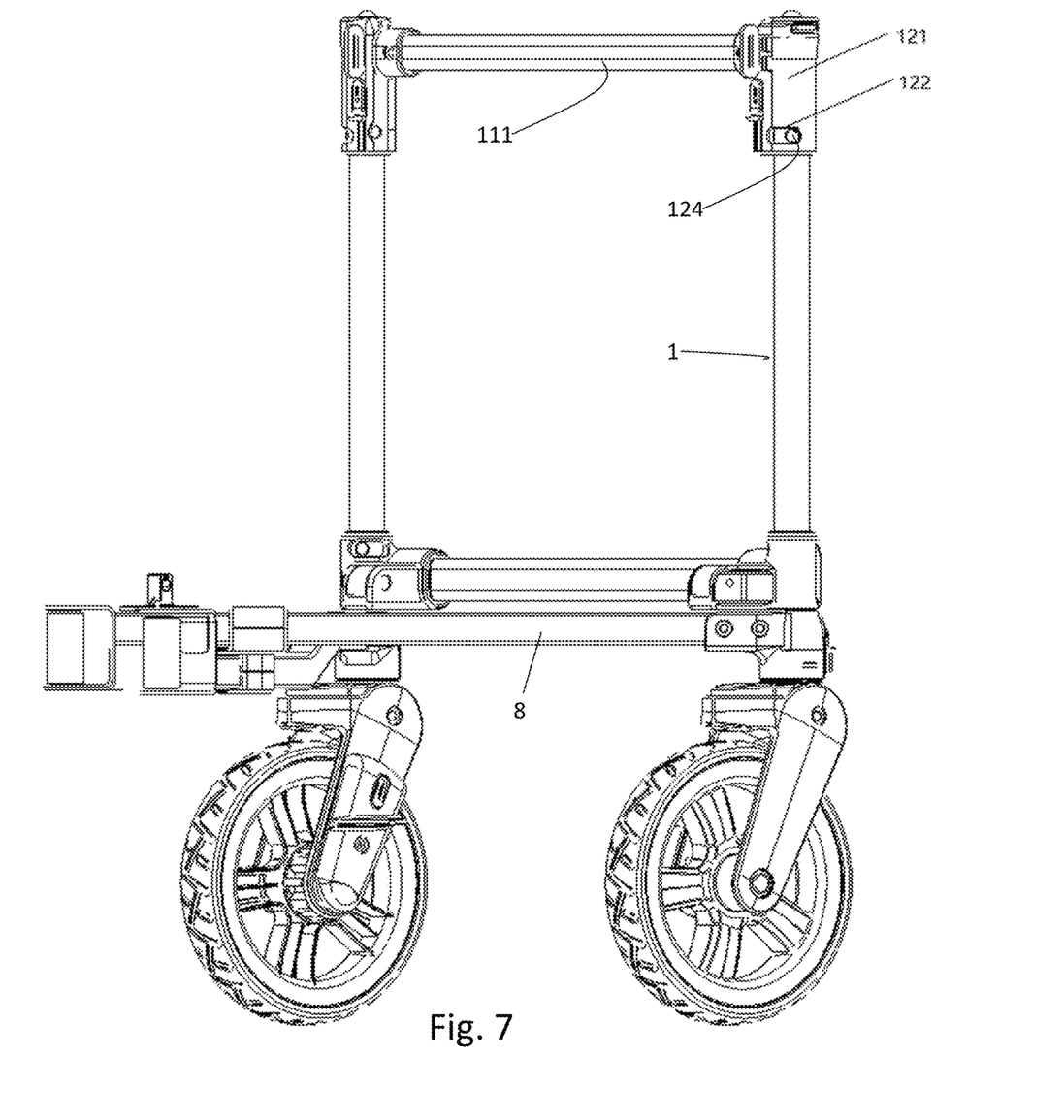
FIG. 7 is a structural view of the foldable wagon showing the front and rear upper connection sleeve.

In order to ensure the strength of the horizontal support frame, the foldable wagon frame further includes a cross-folding frame. The cross-folding frame is located below the horizontal support frame when the wagon frame is in the expanded configuration. The cross-folding frame can support the horizontal support frame to share the load borne by the horizontal support frame. As shown in FIG. 6, the cross-folding frame includes a front cross rod 8 and a rear cross rod 9. One end of the front cross rod 8 is preferably fixedly connected with the lower end of the front wheel frame, and another end of the front cross rod 8 is hingedly connected with an end of the rear cross rod 9 through a vertical hinge shaft 10. The opposite end of the rear cross rod 9 (that is, the end of the rear cross rod 9 away from the front cross rod 8) is preferably fixedly connected to the lower part of the rear wheel frame.

Figure 3:
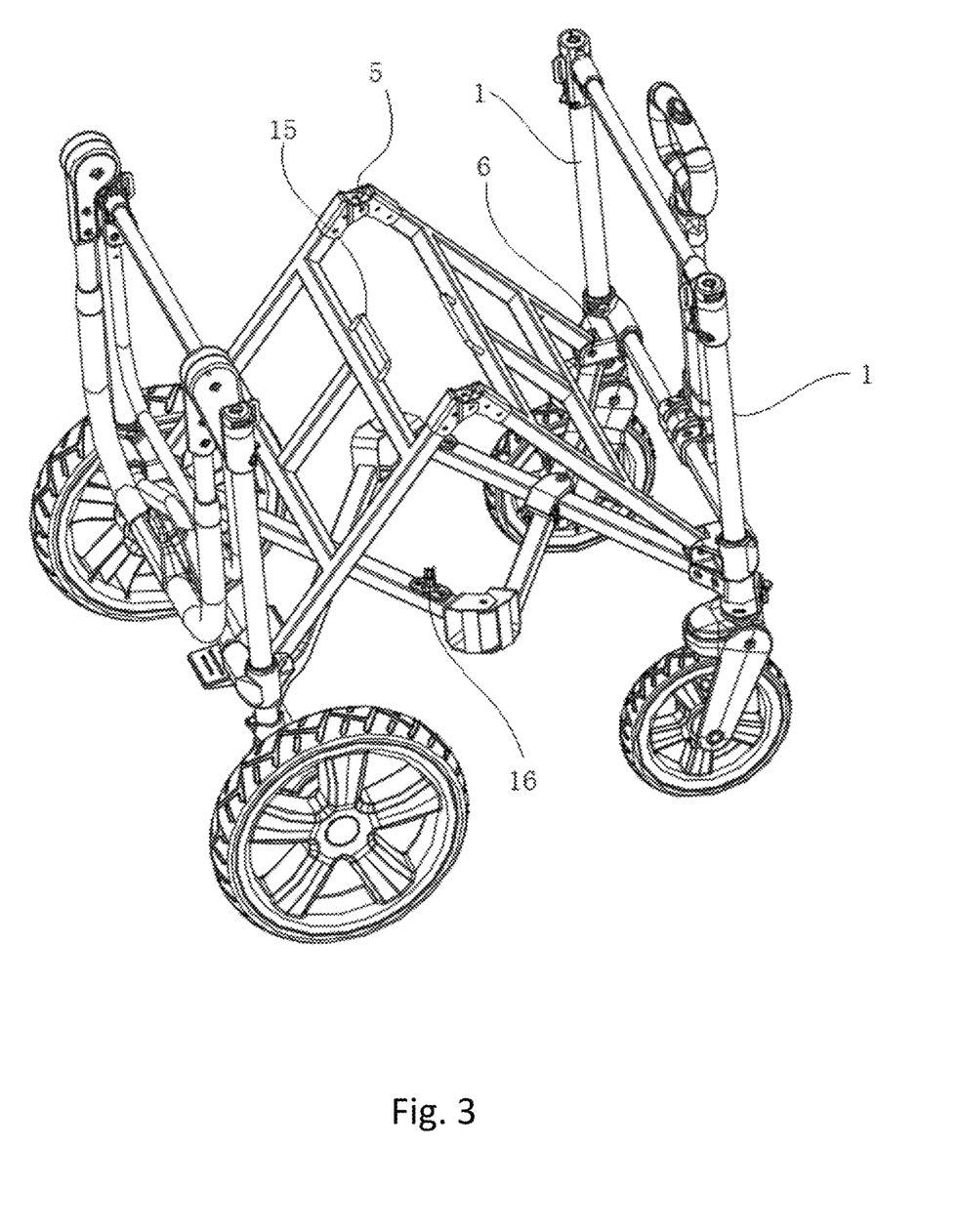
FIG. 3 is a schematic structural diagram of the foldable wagon frame in FIG. 1 as it is being folded.
Figure 4:
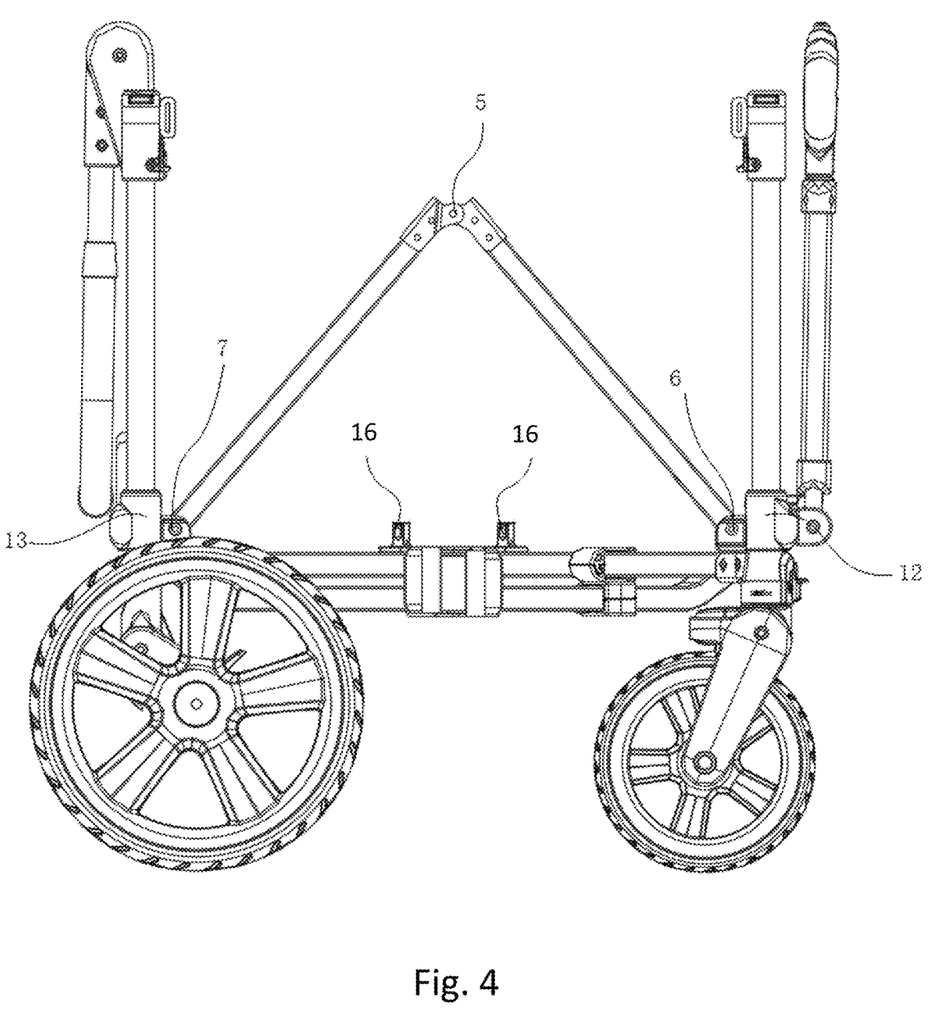
FIG. 4 is a side view of the foldable wagon frame in FIG. 1 as it is being folded.

When the front wheel frame and the rear wheel frame are moved toward each other, as shown in FIG. 3, the middle horizontal hinge shaft(s) 5 moves upward, and the front folding rods 3 and the rear folding rods 4 approach each other, thereby collapsing the horizontal support frame. Meanwhile, the vertical hinge shaft 10 moves horizontally, so that the front cross rod 8 and the rear cross rod 9 approach each other, thereby collapsing the cross-folding frame.

In an embodiment, as shown in FIG. 1, the front wheel frame includes two front vertically-oriented poles 1, and the rear wheel frame includes two rear vertically-oriented poles 2. The lower parts of the two front vertically-oriented poles 1 are each sleeved with a front lower connecting sleeve 12, and each front folding rod 3 is hinged with the corresponding front lower connecting sleeve 12 through a front horizontal hinge shaft 6. Therefore, each front folding rod 3 rotates around the corresponding front horizontal hinge shaft 6, so that each front folding rod 3 can approach the corresponding front vertically-oriented pole 1 when the wagon frame is folded. The front lower connecting sleeve 12 allows for rotation of the front vertically oriented pole 1 relative to the respective front folding rod 3. The lower parts of the two rear vertically-oriented poles 2 are each sleeved with a rear lower connecting sleeve 13, and each rear folding rod 4 is hinged with the corresponding rear connecting sleeve 13 through a rear horizontal hinge shaft 7. When the respective rear folding rod 4 rotates upward around the corresponding rear horizontal hinge shaft 7, the rear folding rod 4 approaches the corresponding rear vertically-oriented pole 2 when the wagon frame is folded. The rear lower connecting sleeve 13 allows for rotation of the rear vertically oriented pole 2 relative to the respective rear folding rod 4. The connecting sleeves 12,13 may each have a tubular sleeve body. One side of the sleeve body may be provided with a hinge groove, and the respective folding rod 3,4 is connected with the hinge groove through the horizontal hinge shaft. In addition, a limit mechanism is provided between each folding rod and the corresponding vertically-oriented pole, and the limit mechanism can limit the maximum rotation angle of the folding rod to 90°. The structure of the limit mechanism may refer to the conventional technology.

The front wheel frame may include a front frame member 111. The front frame member 111 may be operatively connected with the upper part of a front vertically oriented pole 3 with a front upper connecting sleeve 121. The front upper connecting sleeve 121 may be sleeved on an upper part of each of the front vertically oriented poles 1. The front upper connecting sleeve 121 may be configured to allow for rotation of the front vertically-oriented pole 1 relative to the respective front frame member 111. The rear wheel frame may include a rear frame member 113. The rear frame member 113 may be operatively connected with the upper part of a rear vertically oriented pole 2 with a rear upper connecting sleeve 123. The rear upper connecting sleeve 123 may be sleeved on an upper part of each of the rear vertically oriented poles 2. The rear upper connecting sleeve 123 may be configured to allow for rotation of the rear vertically oriented pole 2 relative to the respective rear frame member 113. Making reference to FIG. 7, the upper connecting sleeve 121,123 may have a similar construction and may each include a groove 122, which may be horizontal. The upper part of the each vertically-oriented pole 1,2 may be provided with a protruding limiter 124, for instance, a screw or pin. When the vertically-oriented poles 1,2 rotate during the folding process, the protruding limiter 124 can move along the horizontal direction of the fixed groove 122 of each upper connecting sleeve so configured. The configuration of the pin and groove may be reversed so the pin may be on the sleeve and the groove provided on the vertically-oriented pole.

In an embodiment, as shown in FIG. 3, the cross-folding frame includes two front cross rods 8 and two rear cross rods 9. The two front cross rods 8 are fixedly connected to the lower ends of the two front vertically-oriented poles 1, and the two rear cross rods 9 are fixedly connected to the lower parts of the two rear vertically-oriented poles 2. When the cross rods move during the expanding and folding process, the motion of the cross rods through the respective fixed connection with the vertical pole will drive the vertically-oriented pole to rotate. So, the vertically-oriented poles and the other frame member components connected to the vertically oriented poles can be connected through the aforementioned sleeve connections 12,13,121,123, and/or another mechanism such as a bearing, thereby reducing the resistance during the rotation. In the alternate, the front and rear cross rods may be operatively rotationally connected to their respective vertically oriented poles with a sleeve/bearing connection. The front cross rod 8 on the left lateral side of the foldable wagon frame is hinged with the rear cross rod 9 on the left lateral side, and the front cross rod 8 on the right lateral side of the foldable wagon frame is hinged with the rear cross rod 9 on the right lateral side. In addition, in order to ensure that the two front cross rods 8 and the two rear cross rods 9 do not interfere each other during collapsing, the front cross rod 8 on the left side and the rear cross rod 9 on the right side each have a downwardly bent section, so that a sinking section from the bent section to the end away from the front vertically-oriented pole 1 is formed in the front cross rod 8 on the left side. The height of the sinking section is lower than the front cross rod 8 on the right side, so that the sinking section can cross the front cross rod 8 on the right side. The rear cross rod 9 on the right side also has a sinking section, and the sinking section of the rear cross rod 9 on the right side can cross the rear cross rod 9 on the left side. The fixed connection between the cross rod and the vertically-oriented pole can improve the bearing strength of the cross-folding frame. The user may connect the vertically-oriented pole with the cross rod through a fixed connecting sleeve as required.

In addition, in order to ensure the connection strength between the front cross rod 8 and the rear cross rod 9, the front cross rod 8 and the rear cross rod 9 are each connected with a connecting sheet extending in the horizontal direction. As shown in FIG. 3 and FIG. 6, the front cross rod 8 is connected with two connecting sheets that form a yoke for a hinge connection 10, so the projections of the two connecting sheets in the horizontal direction overlap. The rear cross rod 9 is also connected with two connecting sheets that form a yoke for a hinge connection 10, and the projections of these two connecting sheets in the horizontal direction also overlap. The vertical distance between the two connecting sheets on the front cross rod 8 is greater than the vertical distance between the two connecting sheets on the rear cross rod 9. During connection, the two connecting sheets on the rear cross rod 9 are inserted between the two connecting sheets of the front cross rod 8, the vertical hinge shaft 10 is passed through the two connecting sheets on the rear cross rod 9 and is fixedly connected with the two connecting sheets on the front cross rod 8, thereby hinging the front cross rod 8 with the rear cross rod 9. The user may use other methods in the conventional technology to realize hinge, which is not limited here.

Figure 5:
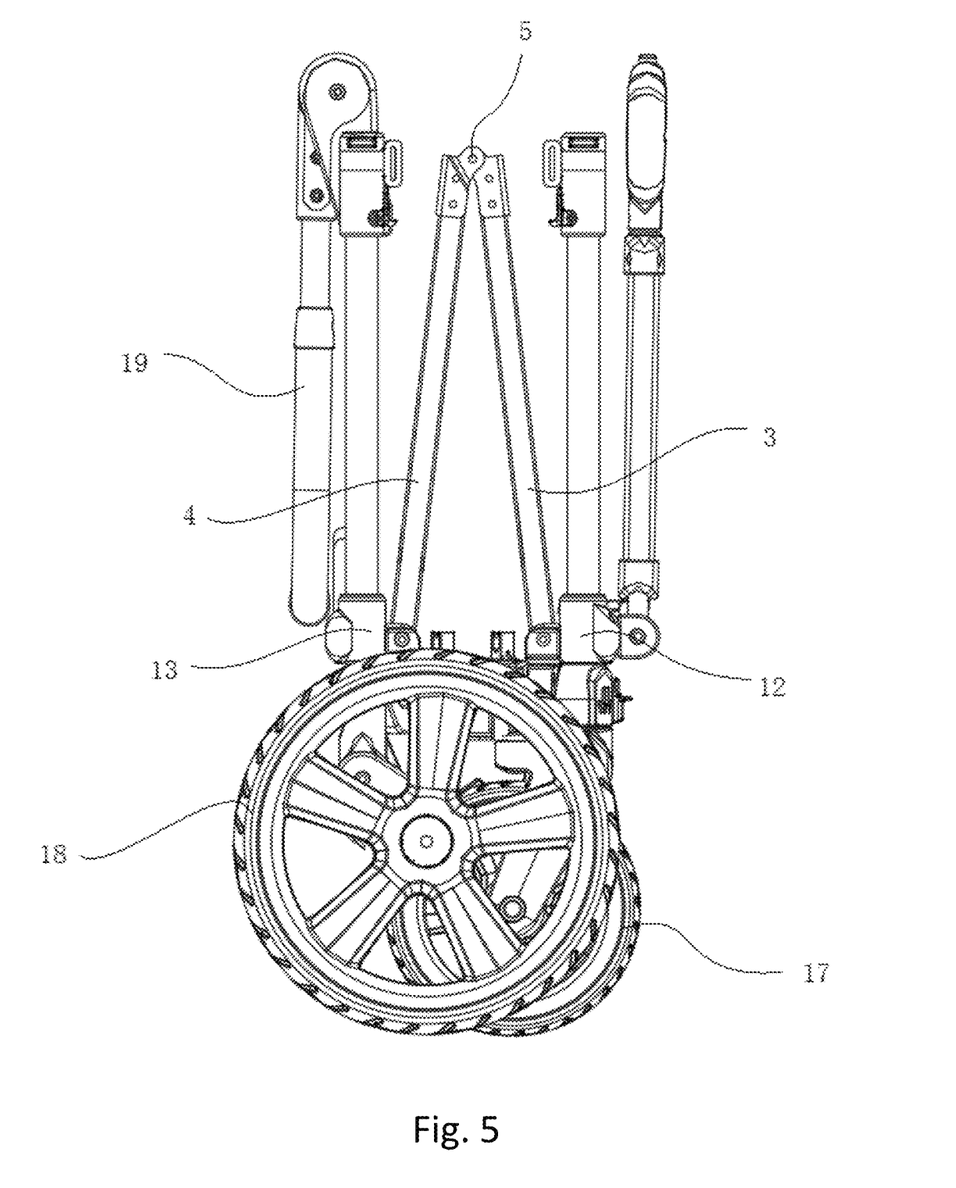
FIG. 5 is a side view of the foldable wagon frame in FIG. 1 after it is folded.

Further, as shown in FIG. 5, a cross sliding sleeve 11 is provided between the two front cross rods 8. The cross sliding sleeve 11 includes two sliding sleeves, the side walls of the two sliding sleeves are hinged, and the two front cross rods 8 are respectively inserted into the two sliding sleeves. When the cross-folding frame is folded or unfolded, the two front cross rods 8 respectively slide in the two sliding sleeves. The two rear cross rods 9 are also connected by another cross sliding sleeve 11. The user may provide the cross sliding sleeve 11 only between the two front cross rods 8 or between the two rear cross rods 9 as required.

In order to ensure that the cross-folding frame can effectively support the horizontal support frame, the support beam of the horizontal support frame is provided with a snapping post 15 extending in the horizontal direction. As shown in FIG. 3, the cross-folding frame is provided with a damping member 16, and the damping member 16 has a snapping groove. After the horizontal support frame and the cross-folding frame are unfolded, the snapping post 15 can be embedded in the snapping groove, so that the horizontal support frame and the cross-folding frame are connected to form an integrated structure.

In an embodiment, the lower ends of the two front vertically-oriented poles 1 are respectively connected with two universal direction or swivel wheels 17, and the lower ends of the two rear vertically-oriented poles 2 are respectively connected with two ends of a rear axle 14, where the two ends of the rear axle 14 are each provided with a rear wheel 18. Projections of the two universal direction or swivel wheels 17 on the rear axle 14 are located between the two rear wheels 18. After the foldable wagon frame is folded, the two universal direction or swivel wheels 17 are located between the two rear wheels 18. As shown in FIG. 5, the two universal direction or swivel wheels 17 and the two rear wheels 18 form four support points to ensure that the foldable wagon frame as folded can be placed upright on its own.

In an embodiment, the upper ends of the two rear vertically-oriented poles 2 are connected with a handrail 19, and the handrail 19 is in the shape of "U". Two ends of the handrail 19 are hinged with the upper ends of the two rear vertically-oriented poles 2 respectively, and the handrail 19 can be folded to a position where it closely contacts the rear vertically-oriented poles 2. The upper end of the rear vertically-oriented pole 2 is further provided with a limiting assembly which limits the rotation range of the handrail 19 to be greater than 90° and less than 180°. When the handrail 19 rotates to the maximum angle, the user can push the foldable wagon frame by means of the handrail 19.

In an embodiment, a storage basket assembly 20 is further provided between the two rear vertically-oriented poles 2, and the storage basket assembly 20 is also in the shape of "U". Two ends of the storage basket assembly 20 are hinged to the middle of the two rear vertically-oriented poles 2 respectively. The maximum rotation angle of the storage basket assembly 20 is 90°. The storage basket assembly 20 can be connected to a storage basket made of cloth. When the storage basket assembly 20 is rotated to the maximum rotation angle, the storage basket can be unfolded to store items. When the storage basket is no longer used, the storage basket assembly 20 can be rotated to the plane where the two rear vertically-oriented poles 2 are located, thus reducing the space occupied by the storage basket assembly 20.

In this embodiment, the foldable wagon frame is provided with a horizontal support frame and a cross-folding frame. A storage space is formed between the horizontal support frame, the front wheel frame and the rear wheel frame for storing items. The cross-folding frame is located below the horizontal support frame, and supports the horizontal support frame to ensure that the foldable wagon frame has sufficient bearing strength. Therefore, there is no need to provide connecting rods on the two sides of the foldable wagon frame, which makes the left and right sides of the storage space open, increases the space volume for storing items of the storage space, and improves the bearing capacity of the foldable wagon frame. In addition, both the horizontal support frame and the cross-folding frame can be folded and received between the front wheel frame and the rear wheel frame, so after the foldable wagon frame is folded, it occupies less space and is convenient for storage.

It should be noted that, relationship terms herein such as first and second are merely used to distinguish an entity from other entities and do not require or imply that there are any such actual relationships or sequences between these entities.

The foldable wagon frame provided by the present application has been described in detail above. The principle and the embodiments of the present application are illustrated herein by specific examples. The above description of examples is only intended to facilitate the understanding of the method and core idea of the present application. It should be noted that, for those skilled in the art, many modifications and improvements may be made to the present application without departing from the principle of the present application, and these modifications and improvements are also deemed to fall into the protection scope of the present application defined by the appended claims.

The invention claimed is:

1. A foldable wagon having a frame configurable between an expanded configuration and a folded configuration, the wagon frame comprising a front wheel frame and a rear wheel frame, a lower part of the front wheel frame having at least two front folding rods (3), a lower part of the rear wheel frame having at least two rear folding rods (4), one of the front folding rods (3) and a corresponding one of the rear folding rods (4) being hingedly connected together by a middle horizontal hinge shaft (5), the front folding rods (3) and the rear folding rods (4) forming a horizontal support frame for the wagon frame when the frame is in the expanded configuration, the wagon frame further comprising a cross-folding frame, the cross folding frame being arranged below the horizontal support frame when the frame is in the expanded configuration, the cross folding frame including a front cross rod (8) and a rear cross rod (9), the front cross rod (8) being operatively connected with a lower end of the front wheel frame, and the rear cross rod (9) being operatively connected with the lower part of the rear wheel frame, the front cross rod (8) and the rear cross rod (9) being hingedly connected with each other through a vertical hinge shaft (10);

wherein the front wheel frame comprises two front vertically-oriented poles (1); and wherein the wagon frame has two front folding rods (3), each of the two front folding rods (3) is hinged with a front lower connecting sleeve (12) through a front horizontal hinge shaft (6), each front lower connecting sleeve (12) is sleeved on a lower part of a corresponding front vertically-oriented pole (1).

2. The foldable wagon according to claim 1, wherein the rear wheel frame comprises two rear vertically-oriented poles (2); the wagon frame has two rear folding rods (4), each of the two rear folding rods (4) is hinged with a corresponding rear lower connecting sleeve (13) through a rear horizontal hinge shaft (7), each rear lower connecting sleeve (13) is sleeved on a lower part of a corresponding rear vertically-oriented pole (2).

3. The foldable wagon according to claim 2, further comprising one support beam arranged between the two front folding rods (3), and another support beam arranged between the two rear folding rods (4).

4. The foldable wagon according to claim 2, wherein the front lower connecting sleeves (12) and rear lower connecting sleeves (13) are configured to allow relative rotation between the respective vertically oriented poles (1,2) and the corresponding folding rods (3,4).

5. The foldable wagon according to claim 2, further comprising a front upper connecting sleeve (121) operatively rotationally connected to an upper part of each front vertically-oriented pole (1) and a rear upper connecting sleeve (123) operatively rotationally connected to an upper part of each rear vertically-oriented pole (2).

6. The foldable wagon according to claim 5 wherein at least one of the upper connecting sleeves (121,123) has one of a groove (122) and a limiting protrusion (124), and the corresponding vertically-oriented pole (1,2) has the other of the groove (122) and the limiting protrusion (124), the limiting protrusion (124) being slidably arranged in the groove (122), the limiting protrusion (124) being configuring to engage opposite ends of the groove (122) to thereby limit rotary motion of the upper connecting sleeve (121,123) with the corresponding vertically-oriented pole (1,2).

7. The foldable wagon according to claim 1, further comprising a snapping post (15) provided on the horizontal support frame, and a damping member (16) provided on the cross-folding frame, the damping member (16) being adapted to releasably engage the snapping post (15) when the frame is in the expanded position.

8. The foldable wagon according to claim 2, wherein the two front vertically-oriented poles (1) have lower ends that are respectively connected with a swivel wheel (17), the two rear vertically-oriented poles (2) have lower ends that are respectively connected with a rear axle (14), and opposite ends of the rear axle (14) are each provided with a rear wheel (18).

9. The foldable wagon according to claim 8, wherein the rear wheels (18) are positioned on the rear axle (14) such that swivel wheels are located between the two rear wheels (18) when the frame is in the folded position.

10. A foldable wagon having a frame configurable between an expanded configuration and a folded configuration, the wagon frame comprising a front wheel frame and a rear wheel frame, a lower part of the front wheel frame having at least two front folding rods (3), a lower part of the rear wheel frame having at least two rear folding rods (4), one of the front folding rods (3) and a corresponding one of the rear folding rods (4) being hingedly connected together by a middle horizontal hinge shaft (5), the front folding rods (3) and the rear folding rods (4) forming a horizontal support frame for the wagon frame when the frame is in the expanded configuration, the wagon frame further comprising a cross-folding frame, the cross folding frame being arranged below the horizontal support frame when the frame is in the expanded configuration, the cross folding frame including two front cross rods (8) and two rear cross rods (9), the front cross rods (8) being operatively connected with a lower end of the front wheel frame, and the rear cross rods (9) being operatively connected with the lower part of the rear wheel frame, each of the front cross rods (8) is hingedly connected with a corresponding rear cross rod (9) through a vertical hinge shaft (10);
wherein the front wheel frame comprises two front vertically-oriented poles (1), and the rear wheel frame comprises two rear vertically-oriented poles (2); and
wherein the two front cross rods (8) are respectively fixedly connected with the lower ends of the two front vertically-oriented poles (1) and the two rear cross rods (9) are respectively fixedly connected with the lower parts of the two rear vertically-oriented poles (2).

11. The foldable wagon according to claim 10, wherein a front and a rear folding rod (3,4) are rotationally connected to a respective vertically-oriented pole (1,2).

12. A foldable wagon having a frame configurable between an expanded configuration and a folded configuration, the wagon frame comprising a front wheel frame and a rear wheel frame, a lower part of the front wheel frame having at least two front folding rods (3), a lower part of the rear wheel frame having at least two rear folding rods (4), one of the front folding rods (3) and a corresponding one of the rear folding rods (4) being hingedly connected together by a middle horizontal hinge shaft (5), the front folding rods (3) and the rear folding rods (4) forming a horizontal support frame for the wagon frame when the frame is in the expanded configuration, the wagon frame further comprising a cross-folding frame, the cross folding frame being arranged below the horizontal support frame when the frame is in the expanded configuration, the cross folding frame including two front cross rods (8) and two rear cross rods (9), the front cross rods (8) being operatively connected with a lower end of the front wheel frame, and the rear cross rods (9) being operatively connected with the lower part of the rear wheel frame, each of the front cross rods (8) is hingedly connected with a corresponding rear cross rod (9) through a vertical hinge shaft (10); and further comprising a cross sliding sleeve (11) arranged between at least one of the two front cross rods (8) and the two rear cross rods (9).

\* \* \* \* \*